(12) United States Patent
Leamy et al.

(10) Patent No.: US 10,247,100 B2
(45) Date of Patent: Apr. 2, 2019

(54) JET ENGINE COLD AIR COOLING SYSTEM

(71) Applicant: General Electric Company, Schenectady, NY (US)

(72) Inventors: Kevin Richard Leamy, Loveland, OH (US); Benjamin Paul Breig, Liberty Township, OH (US); Michael Jay Epstein, Mason, OH (US); Javier Armando Parrilla, Fairfield, OH (US); Matthew John Hurt, Liberty Township, OH (US); Thomas Edward Brinson, Mason, OH (US); Andrew James Fleming, Franklin, OH (US)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 14/755,398

(22) Filed: Jun. 30, 2015

(65) Prior Publication Data

US 2016/0153359 A1 Jun. 2, 2016

Related U.S. Application Data

(60) Provisional application No. 62/022,364, filed on Jul. 9, 2014, provisional application No. 62/020,514, filed on Jul. 3, 2014.

(51) Int. Cl.
*F02C 1/00* (2006.01)
*F02C 7/18* (2006.01)
(Continued)

(52) U.S. Cl.
CPC ............ *F02C 7/185* (2013.01); *B64D 13/006* (2013.01); *B64D 13/06* (2013.01); *F01D 13/02* (2013.01);
(Continued)

(58) Field of Classification Search
CPC .... F02C 7/185; F02C 6/08; B64D 2013/0603; B64D 13/06
See application file for complete search history.

(56) References Cited

U.S. PATENT DOCUMENTS 2,585,570 A * 2/1952 Messinger ............. B64D 13/06
454/74
2,966,036 A 12/1960 Stowens
(Continued)

FOREIGN PATENT DOCUMENTS

GB       859668 A      1/1961
WO    0216743 A1    2/2002

OTHER PUBLICATIONS

Moir et al., Aircraft Systems: Mechanical, Electrical and Avionics Subsystems Integration, Third Edition, May 2008.
(Continued)

*Primary Examiner* — Gerald L Sung
(74) *Attorney, Agent, or Firm* — General Electric Company; Brian P. Overbeck

(57) ABSTRACT

Airplanes and jet engines are provided that includes an engine compressor; a combustor in flow communication with the engine compressor; an engine turbine in flow communication with the combustor to receive combustion products from the combustor; and a bleed air cooling system in fluid communication with bleed air from the engine compressor. The bleed air cooling system can include a first precooler in fluid communication with the bleed air from the engine compressor; a cooling system turbine in fluid communication with and downstream from the first precooler; and a discharge conduit from the cooling system turbine that is configured to be in fluid communication with at least one of an aircraft thermal management system and an aircraft (Continued)

environmental control system. Methods are also described for providing cooling fluid from a jet engine.

17 Claims, 7 Drawing Sheets

(51) Int. Cl.
  *B64D 13/00* (2006.01)
  *B64D 13/06* (2006.01)
  *F01D 13/02* (2006.01)
  *F01D 17/08* (2006.01)
  *F01D 17/10* (2006.01)
  *F01D 25/12* (2006.01)
  *F02C 6/08* (2006.01)
  *F02C 9/18* (2006.01)

(52) U.S. Cl.
  CPC ............ *F01D 17/08* (2013.01); *F01D 17/10* (2013.01); *F01D 25/12* (2013.01); *F02C 6/08* (2013.01); *F02C 9/18* (2013.01); *B64D 2013/0618* (2013.01); *B64D 2013/0648* (2013.01); *B64D 2013/0688* (2013.01); *F05D 2220/323* (2013.01); *F05D 2220/3216* (2013.01); *F05D 2260/211* (2013.01); *F05D 2260/213* (2013.01); *F05D 2260/232* (2013.01); *F05D 2270/301* (2013.01); *F05D 2270/303* (2013.01); *Y02T 50/56* (2013.01); *Y02T 50/675* (2013.01); *Y02T 50/676* (2013.01)

(56) References Cited

U.S. PATENT DOCUMENTS

| | | | |
|---|---|---|---|
| 3,097,508 A | 7/1963 | Leech | |
| 4,261,416 A | 4/1981 | Hamamoto | |
| 4,514,976 A * | 5/1985 | Christoff | B64D 13/06 60/39.15 |
| 4,523,517 A | 6/1985 | Cronin | |
| 5,125,597 A | 6/1992 | Coffinberry | |
| 5,136,837 A | 8/1992 | Coffinberry | |
| 5,137,230 A | 8/1992 | Coffinberry | |
| 5,141,182 A | 8/1992 | Coffinberry | |
| 5,143,329 A | 9/1992 | Coffinberry | |
| 5,442,905 A | 8/1995 | Claeys et al. | |
| 5,600,965 A * | 2/1997 | Jan | B64D 13/06 62/401 |
| 5,906,111 A * | 5/1999 | Lui | B64D 13/06 62/172 |
| 6,295,822 B1 | 10/2001 | Mueller | |
| 6,305,156 B1 | 10/2001 | Lui et al. | |
| 6,415,595 B1 | 7/2002 | Wilmot, Jr. et al. | |
| 6,457,318 B1 * | 10/2002 | Lui | B64D 13/06 62/402 |
| 7,624,592 B2 | 12/2009 | Lui et al. | |
| 2006/0196216 A1 | 9/2006 | Bruno et al. | |
| 2007/0113579 A1 * | 5/2007 | Claeys | B64D 13/02 62/401 |
| 2012/0000205 A1 * | 1/2012 | Coffinberry | B64D 13/06 60/806 |
| 2013/0086927 A1 | 4/2013 | Mills | |
| 2015/0065025 A1 * | 3/2015 | Bruno | B64D 13/04 454/74 |
| 2016/0272329 A1 * | 9/2016 | Beers | F04D 29/057 |

OTHER PUBLICATIONS

PCT Search Report and Written Opinion issued in connection with related PCT Application No. PCT/US2015/038528 dated Sep. 28, 2015.

PCT Search Report and Written Opinion issued in connection with related PCT Application No. PCT/US2015/038524 dated Oct. 2, 2015.

* cited by examiner

JET ENGINE COLD AIR COOLING SYSTEM

PRIORITY INFORMATION

The present application claims priority to U.S. Provisional Patent Application Ser. No. 62/020,512 titled "Jet Engine Cold Air Cooling System" of Leamy, et al. filed on Jul. 3, 2014, and to U.S. Provisional Patent Application Ser. No. 62/022,364 titled "Jet Engine Cold Air Cooling System" of Leamy, et al. filed on Jul. 9, 2014, the disclosures of which are incorporated by reference herein.

FEDERALLY SPONSORED RESEARCH

This invention was made with government support under contact number FA8650-09-D-2922 of the Department of the Air Force. The government may have certain rights in the invention.

FIELD OF THE INVENTION

The present disclosure is directed to jet engines and, more specifically, to utilization of jet engine bleed air for cooling thermal loads associated with the engine or vehicle to which the engine is coupled.

BACKGROUND OF THE INVENTION

Modern day jet airplanes direct regulated airflow from the jet engine to the occupied cabins and other areas of the aircraft. This airflow, commonly referred to as bleed air, may be withdrawn from the high pressure compressor (HPC) section of a jet engine. U.S. Pat. Nos. 5,137,230 and 5,125,597 describe conventional structures and methods utilized to direct bleed air into environmental control systems (ECS) of the aircraft that further process the bleed air prior to cabin introduction. ECS incorporate various pieces of equipment such as air cycle machines (ACMs), regulating valves, heat exchangers, and other apparatus to condition engine bleed air prior to cabin introduction.

Bleed air is commonly extracted from multiple locations along the HPC section using regulated flow to control the extent to which bleed air is withdrawn. Among the regulating structures are check valves that operate to allow or discontinue airflow and downstream regulator valves that reduce the pressure of the withdrawn bleed air before it reaches the ECS. This reduced pressure bleed air may be directed to a turbine, where work is extracted, with the bleed air outlet pressure and temperature from the turbine being significantly reduced. This reduced pressure bleed air remains relatively hot and is thereafter cooled by fan air in a heat exchanger associated with the jet engine conventionally referred to as a precooler. Cooled bleed air output from the precooler is delivered to the ECS where it may be further cooled and pressures further regulated prior to introduction to the occupied cabins or other areas of the aircraft. In addition to supplying bleed air to the ECS, the jet engine provides a heat sink that provides precooled air to the aircraft and receives high temperature air from the aircraft in return as part of a cycle.

Regardless of the structures or methods utilized, one constant has remained with respect to the bleed air supplied to the ECS: it could be no lower in temperature than the lowest temperature air flowing through the jet engine. Moreover, the bleed air has always been regulated from the HPC using flow control valves that restrict airflow and are operative to step down the bleed air pressure prior to reaching the precooler. Consequently, there is a need in the art for structures and methods of delivering bleed air to an ECS at temperatures lower than the lowest temperature air otherwise flowing through the jet engine.

BRIEF DESCRIPTION OF THE INVENTION

Aspects and advantages of the invention will be set forth in part in the following description, or may be obvious from the description, or may be learned through practice of the invention.

A jet engine is generally provided that includes an engine compressor; a combustor in flow communication with the engine compressor; an engine turbine in flow communication with the combustor to receive combustion products from the combustor; and a bleed air cooling system in fluid communication with bleed air from the engine compressor. In one embodiment, the bleed air cooling system includes a first precooler in fluid communication with the bleed air from the engine compressor; a cooling system turbine in fluid communication with and downstream from the first precooler; and a discharge conduit from the cooling system turbine that is configured to be in fluid communication with at least one of an aircraft thermal management system and an aircraft environmental control system.

Methods are also generally described for providing cooling fluid from a jet engine. In one embodiment, the method includes: extracting a first portion of an airflow flowing through a jet engine compressor section of a jet engine at a first temperature; directing the first portion of the airflow into fluid communication with a first heat exchanger to reduce a temperature of the first portion of the airflow to a second temperature; and flowing the first portion of the airflow downstream from the first heat exchanger through a cooling system turbine to reduce the temperature of the first portion of the airflow to a third temperature, wherein the third temperature is less than a flow path temperature of air flowing into the jet engine.

Airplanes are also generally provided that include a jet engine and an aircraft including at least one of an aircraft thermal management system and an aircraft environmental control system. The jet engine, in one embodiment, includes: a jet engine thermal management system in two-way fluid communication with an aircraft thermal management system and a cold fluid system. The jet engine thermal management system receives a discharge stream from the aircraft thermal management system and supplies an inlet stream to the aircraft thermal management system. The cold fluid system includes: a first precooler in fluid communication with and downstream from a jet engine compressor section of the jet engine, and a first turbine in fluid communication with and downstream from the precooler. An output from the first turbine is in fluid communication with at least one of the aircraft thermal management system and the aircraft environmental control system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
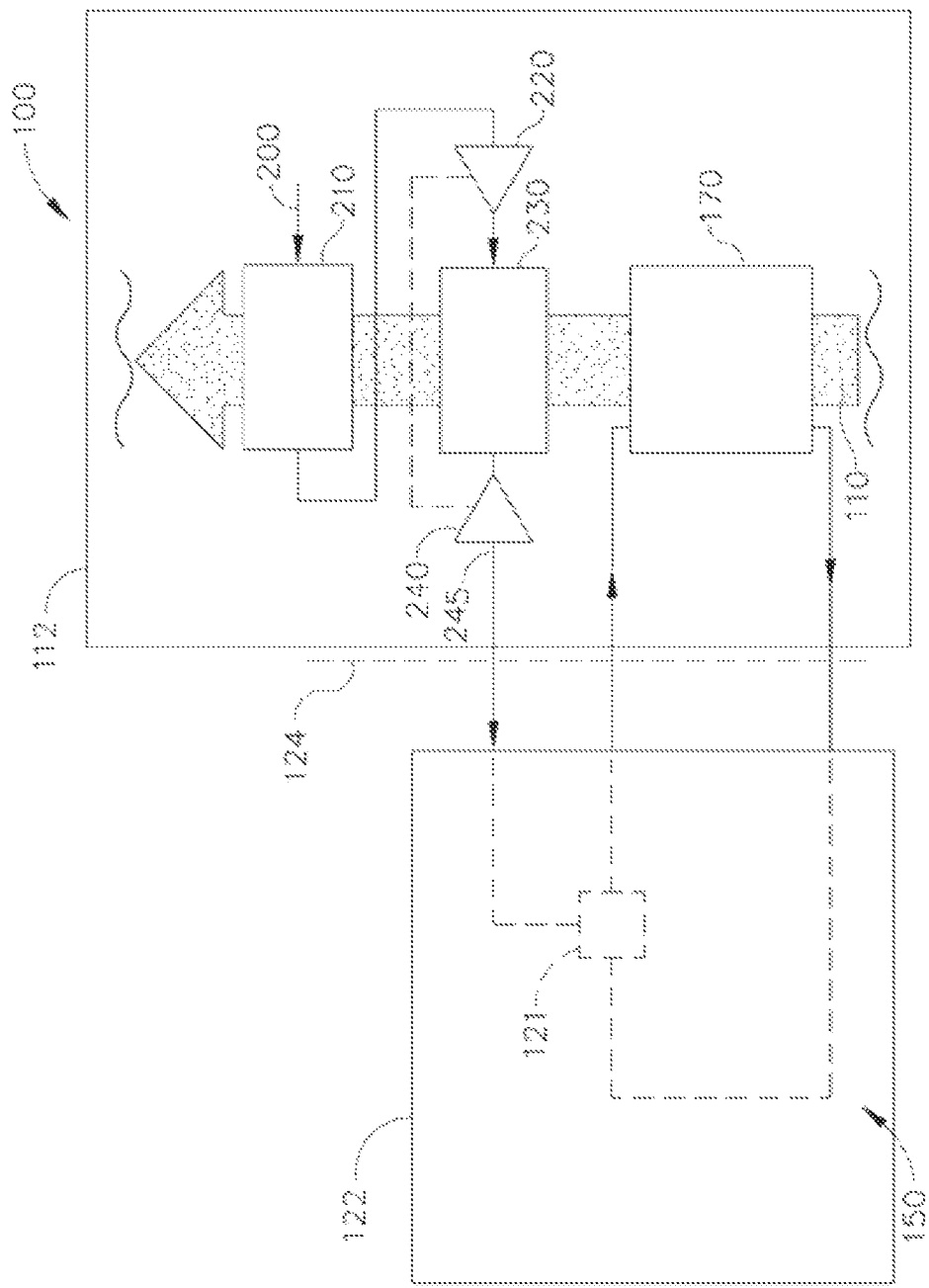
FIG. 1 is a schematic diagram of an exemplary embodiment of a cold air cooling system, shown by way of example as part of an airplane.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. Also, the terms "upstream" and "downstream" refer to the relative direction with respect to fluid flow in a fluid pathway. For example, "upstream" refers to the direction from which the fluid flows, and "downstream" refers to the direction to which the fluid flows.

A bleed air cooling system is generally provided that is in fluid communication with bleed air from a compressor within a jet engine. The bleed air cooling system is generally configured to cool the received bleed air and provide the cooled air (e.g., via a discharge conduit from the bleed air cooling system) to at least one of an aircraft thermal management system and an aircraft environmental control system. The cooled air output from the cooling system has, in one embodiment, a temperature that is less than the mean flow path temperature of air coming into and through the engine. Methods of providing cooled fluid (e.g., cooled air) are also generally provided, with the input air being extracted from the jet engine (e.g., bleed air from the engine compressor).

Referencing FIGS. 1 and 6, a first exemplary cold air cooling system 100 is configured to supply unregulated bleed air from a high pressure compressor (HPC) of a jet engine 112 to an aircraft thermal management system and/or an environmental control system (ECS) 121 of an aircraft 122 at a temperature that is below the engine air stream 110. For purposes of the instant disclosure, an engine cooling stream includes, without limitation, one or more of the following: fan stream air, inlet air drawn into the intake, and ram air. Pursuant to the following exemplary explanation, the system 100 of the jet engine 112 will be described as being in fluid communication with structures associated with the aircraft 122.

Figure 6:
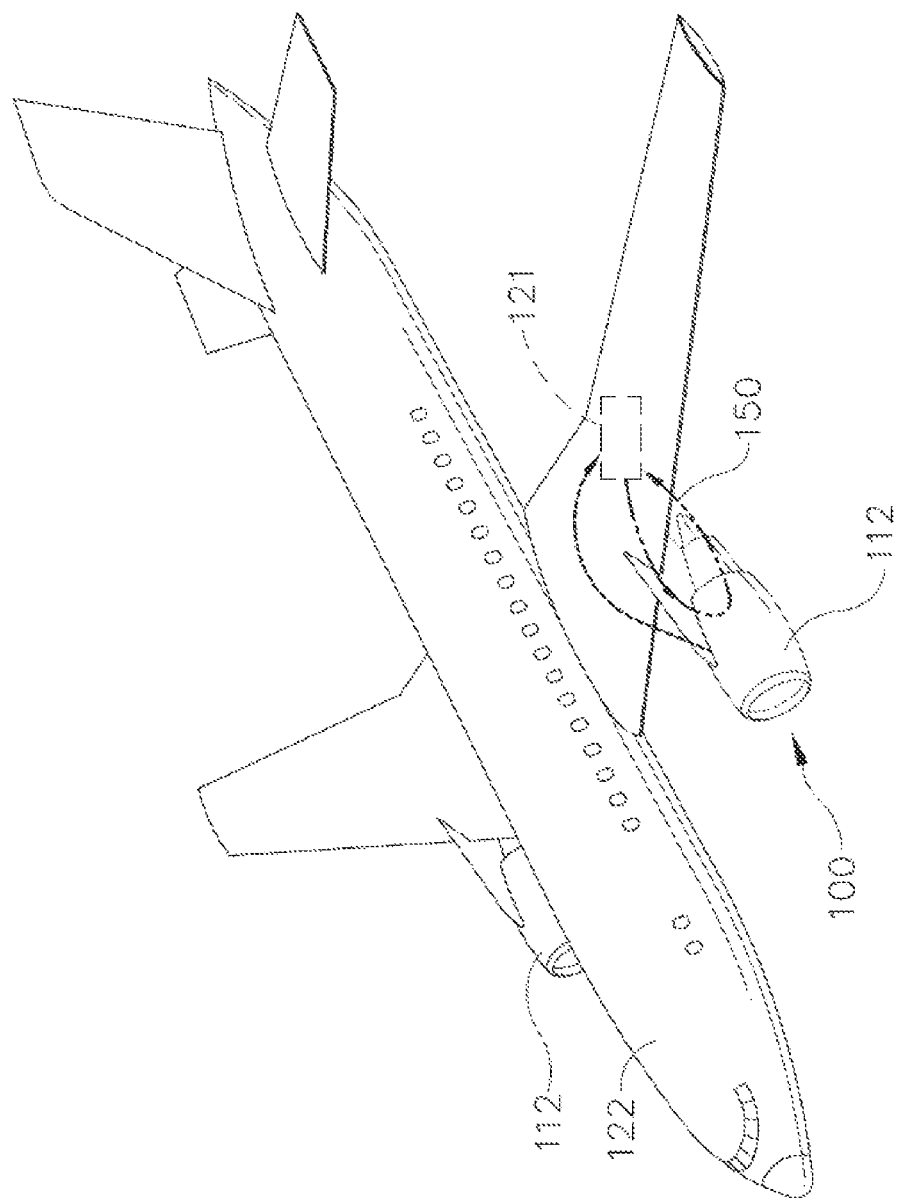
FIG. 6 is an elevated perspective view of an airplane incorporating a cold air cooling system in accordance with the instant disclosure.

Referencing FIGS. 1 and 6, a conventional thermal management system (TMS) loop 150 is utilized to draw thermal energy away from the aircraft 122 and deliver/pump this thermal energy to the jet engine TMS 170. In order to better differentiate those structures associated with aircraft 122 from structures of the engine 112, a dotted line 124 is depicted. Consequently, structures to the right of the dotted line 124 are depicted and described in exemplary form as part of the engine 112, whereas those structures to the left of the dotted line 124 are depicted and described in exemplary form as separate from the engine 112 and are associated with the aircraft 122. It should be understood, however, that certain of the components associated with the aircraft 122 could instead be part of the engine 112, and vice versa. Accordingly, those skilled in the art should understand that the structures and description are exemplary in nature and the identification of structures as being part of the engine 112 or part of the aircraft 122 is not limiting.

Referring to FIG. 1, an exemplary cold air cooling system 100 is shown and includes a bleed air inlet feed 200 that is unregulated from the HPC section of the engine 112. This bleed air inlet feed 200 supplies high pressure and high temperature compressed air to a first precooler 210. In exemplary form, this first precooler 210 facilitates the transfer of thermal energy from the high pressure and high temperature bleed air to cooler air that is drawn into the engine 112. The bleed air output from the precooler 210 may have a significantly reduced temperature, but its pressure is not significantly changed. This lower temperature, high pressure air is fed into a cooling system compressor 220, which increases the temperature and pressure of the air. Consequently, the air output from the compressor 220 is significantly more pressurized and higher in temperature than the air input to the compressor. This very high pressure, high temperature air output from the compressor is directed to a cooling system precooler 230. By way of example, the cooling system precooler 230 facilitates the transfer of thermal energy from the very high pressure and high temperature bleed air to flow path temperature air that is drawn into the engine 112. The bleed air output from the cooling system precooler 230 has a significantly reduced temperature, but its very high pressure will not be significantly changed. This very high pressure, lower temperature bleed air output from the cooling system precooler 230 is directed into a cooling system turbine 240 having a variable area turbine nozzle (VATN). It should be noted, however, that a multiple position turbine nozzle or a fixed area turbine nozzle may be used in lieu of the variable area turbine nozzle. Work performed by the very high pressure bleed air turning the turbine 240 is utilized to power the compressor 220, with the output bleed air having a significantly reduced pressure and temperature. Those skilled in the art will understand that the turbine 240 may be mechanically or fluidically linked to the compressor 220 to transfer the work resulting from the very high pressure air expanding through the turbine.

In exemplary form, the temperature of the bleed air output from the turbine 240 into the discharge conduit 245 is lower than the mean flow path temperature of air coming into the engine 112. This is in stark contrast to prior art bleed air cooling systems that were unable to deliver bleed air to the aircraft 122 at a temperature below that of the mean flow path temperature of air coming into the engine 112.

Figure 2:
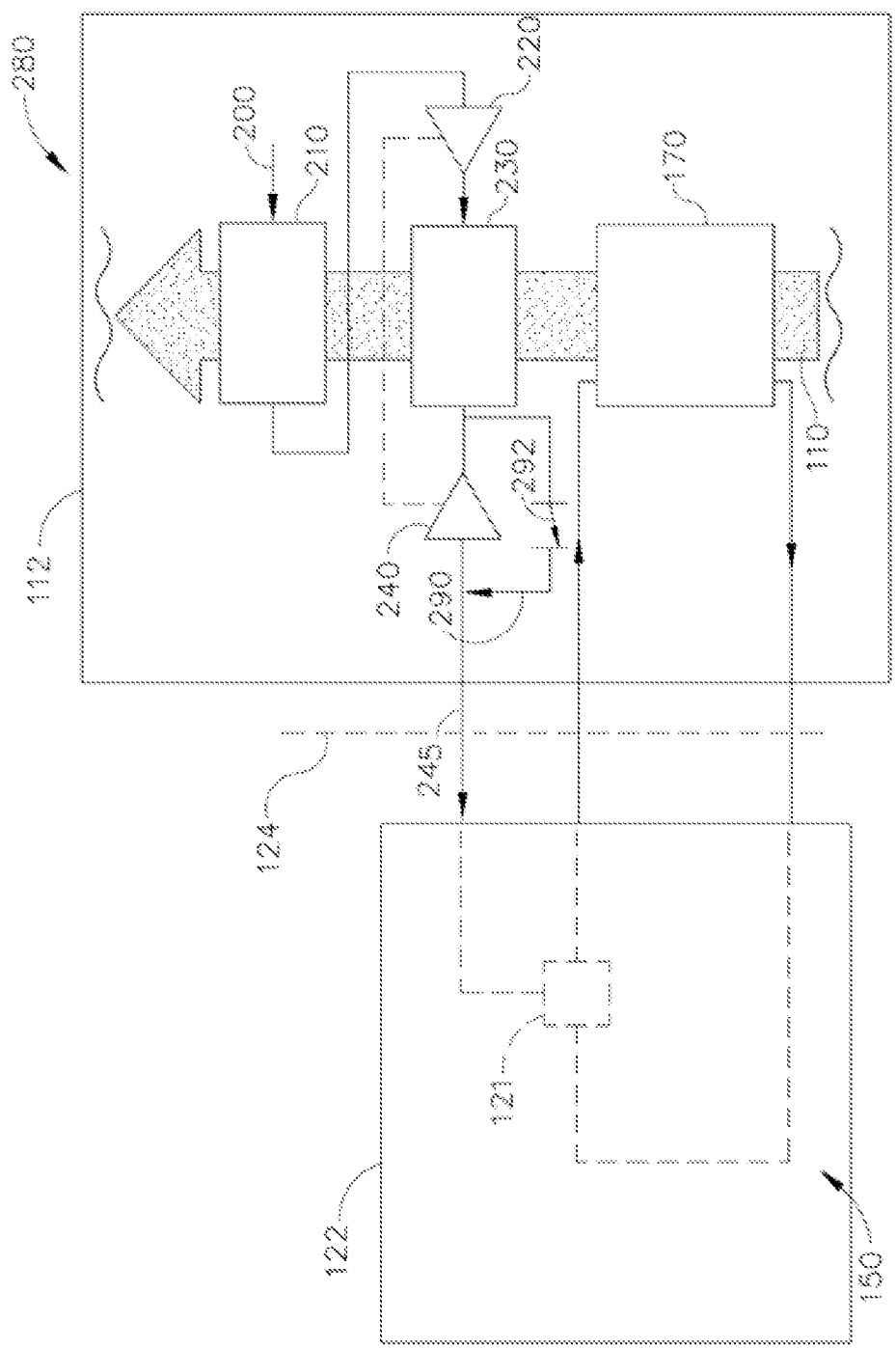
FIG. 2 is a schematic diagram of another exemplary embodiment of a cold air cooling system, shown by way of example as part of an airplane.

As shown in FIG. 2, an alternate exemplary cold air cooling system 280 includes the structures of the first exemplary cold air cooling system 100 and, for illustration purposes only, will be explained for use with the TMS loop 150 from the first exemplary embodiment. Accordingly, like reference numerals refer to similar structures as discussed pursuant to the first exemplary embodiment and will not be repeated in furtherance of brevity.

In addition to the structures of the first exemplary cold air cooling system, this first alternate exemplary cold air cooling system 280 includes a bypass line 290 and a control valve 292 in series with the bypass line. In exemplary form, the bypass line 290 is connected between the inlet and outlet of the turbine 240 to selectively allow air discharged from the cooling system precooler 230 to be directed to the ECS 121 without traveling through the turbine. By way of example, the control valve 292 is communicatively coupled to a thermocouple (not shown) in thermal communication with air discharged from the turbine 240.

Depending upon the operating conditions of the engine 112 and the ambient air properties (temperature, pressure, etc.), it may be advantageous to have bleed air bypass the turbine 240. For example, if the temperature of the air being discharged from the turbine 240 is too low, the control valve 292 may receive temperature readings from the thermocouple and, based upon program parameters, open or close valves in series with the bypass line 290 in order to increase and control the temperature of bleed air delivered to the aircraft 122 within a predetermined range. Alternatively, or in addition, the control valve 292 may be in communication with a pressure sensor at the discharge of the turbine 240. In instances where the discharge pressure is too low, the control valve 292 may receive pressure readings from the pressure sensor and, based upon program parameters, open or close valves in series with the bypass line 290 in order to increase and control the pressure of bleed air delivered to the aircraft 122 within a predetermined range. While the foregoing bypass has been described as having active management, those skilled in the art will understand that passive management is likewise feasible.

Figure 3:
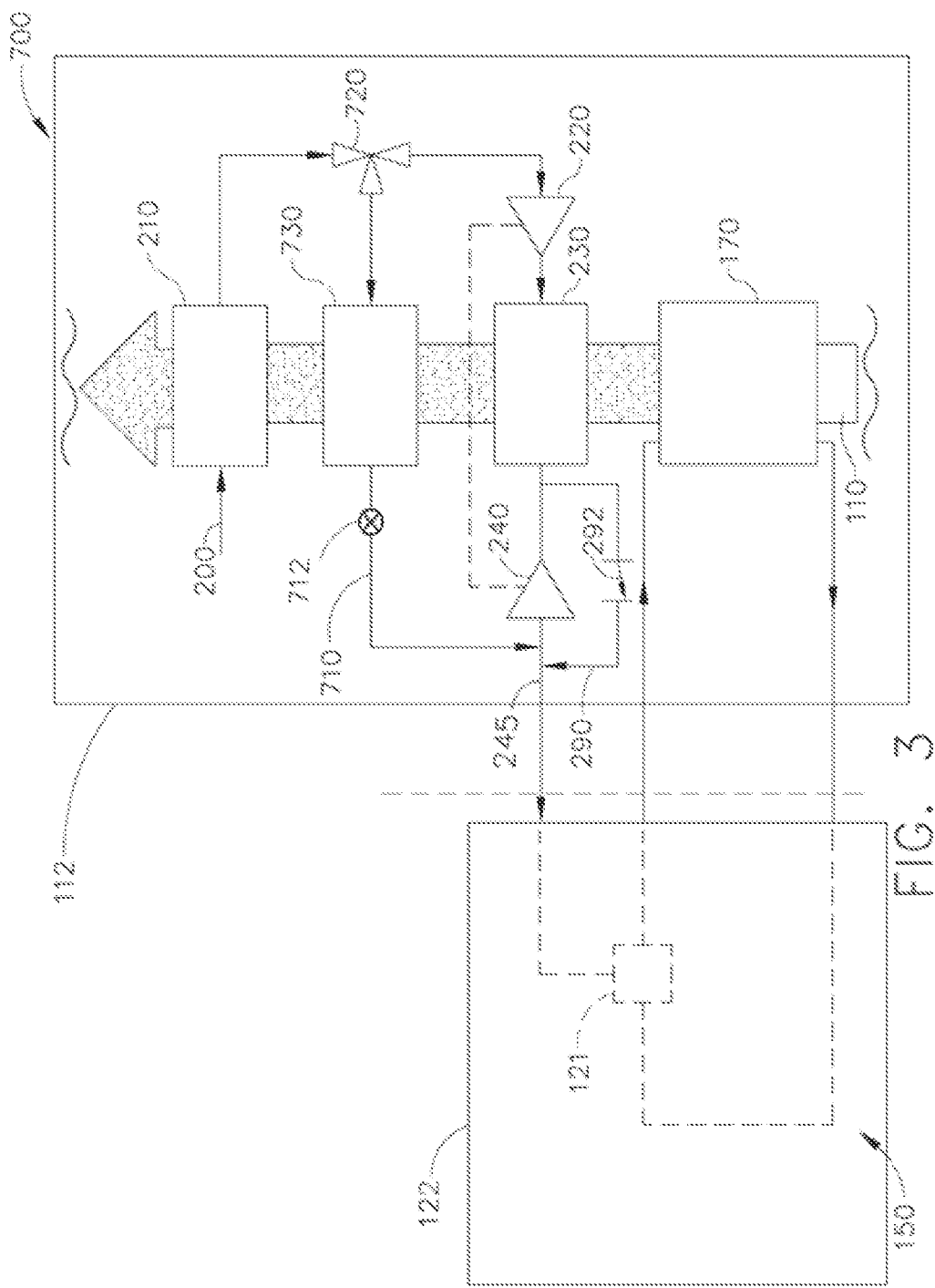
FIG. 3 is a schematic diagram of a yet another exemplary embodiment of a cold air cooling system, shown by way of example as part of an airplane.

As shown in FIG. 3, a further alternate exemplary cold air cooling system 700 includes the structures of the first alternate exemplary cold air cooling system 280. Accordingly, like reference numerals refer to similar structures as discussed pursuant to the first alternate exemplary embodiment and will not be repeated in furtherance of brevity.

In addition to the structures of the first alternate exemplary cold air cooling system 280, this further alternate exemplary cold air cooling system 700 includes a bypass line 710 and a control valve 720 downstream from and in fluid communication with the outlet side of the first precooler 210. In exemplary form, the bypass line 710 is connected between the outlet of a heat exchanger 730 and the outlet of the turbine 240 to selectively allow air discharged from the heat exchanger 730 to be directed downstream from the turbine 240. The heat exchanger 730 receives mean flow path air drawn into the engine 112 and uses this air as a heat sink to transfer thermal energy from the higher temperature air exiting the first precooler 210. By way of example, the control valve 720 may be communicatively coupled to a thermocouple (not shown) in thermal communication with air discharged from the turbine 240. Alternatively, the control valve 720 may be passively controlled and positioned downstream from the heat exchanger 730 in order to increase the temperature and/or pressure of the air delivered to the aircraft 122.

A discharge valve 712 is optionally positioned in the bypass line 710 and in fluid communication with and downstream from the heat exchanger 730, but upstream from the discharge conduit 245. The discharge valve 712 is configured to control fluid flow from the heat exchanger 730 to the discharge conduit 245. The discharge valve 712 may receive temperature readings from the thermocouple and, based upon program parameters, open or close valves in series with the bypass line 710 in order to increase and control the temperature of bleed air delivered to the aircraft 122 within a predetermined range. Alternatively, or in addition, the discharge valve 712 may be in communication with a pressure sensor at the discharge of the turbine 240. In instances where the discharge pressure is too low, the discharge valve 712 may receive pressure readings from the pressure sensor and, based upon program parameters, open or close valves in series with the bypass line 710 in order to increase and control the pressure of bleed air delivered to the aircraft 122 within a predetermined range. While the foregoing bypass has been described as having active management, those skilled in the art will understand that passive management is likewise feasible.

Depending upon the operating conditions of the engine 112 and the ambient air properties (temperature, pressure, etc.), it may be advantageous to have bleed air bypass the turbine 240. For example, if the temperature of the air being discharged from the turbine 240 is too low, the control valve 720 may receive temperature readings from the thermocouple and, based upon program parameters, open or close valves in series with the bypass line 710 in order to increase and control the temperature of bleed air delivered to the aircraft 122 within a predetermined range. Alternatively, or in addition, the control valve 720 may be in communication with a pressure sensor at the discharge of the turbine 240. In instances where the discharge pressure is too low, the control valve 720 may receive pressure readings from the pressure sensor and, based upon program parameters, open or close valves in series with the bypass line 710 in order to increase and control the pressure of bleed air delivered to the aircraft 122 within a predetermined range.

Figure 4:
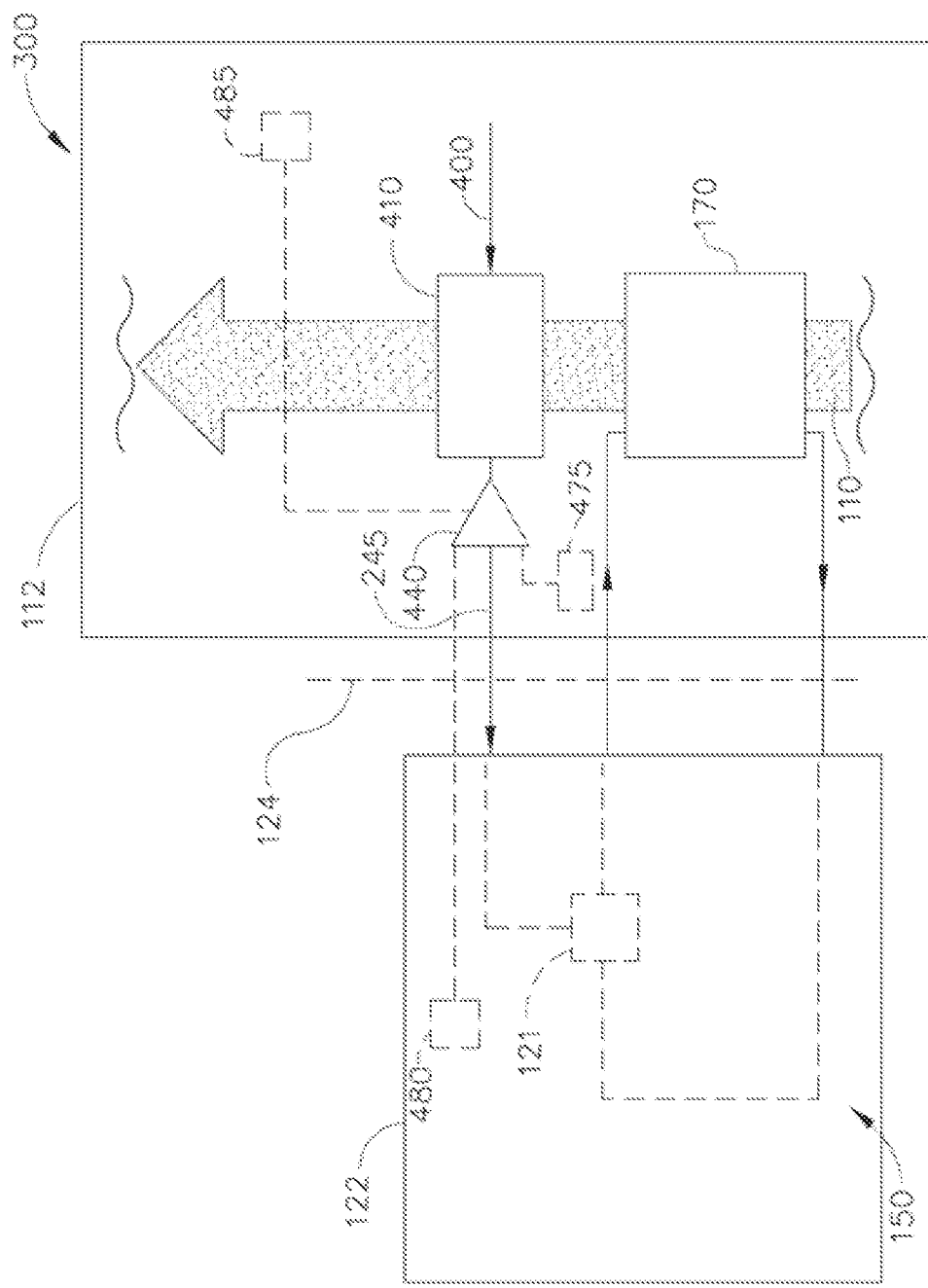
FIG. 4 is a schematic diagram of a still another exemplary embodiment of a cold air cooling system, shown by way of example as part of an airplane.

Referring to FIG. 4, a second exemplary cold air cooling system 300 is configured to supply unregulated bleed air from a high pressure compressor (HPC) section of a jet engine 112 to an aircraft 122 at a temperature that is below the temperature of the air flowing into the engine 112. For illustration purposes only, the second exemplary cold air cooling system 300 will be explained for use with the TMS loop 150 from the first exemplary embodiment. Accordingly, like reference numerals refer to similar structures as discussed pursuant to the first exemplary embodiment and will not be repeated in furtherance of brevity.

As with the first exemplary embodiment, the second exemplary cold air cooling system 300 includes a bleed air inlet feed 400 that is unregulated from the HPC section of the engine 112. This bleed air inlet feed 400 supplies high pressure and high temperature compressed air to a first precooler 410. In exemplary form, this first precooler 410 facilitates the transfer of thermal energy from the high pressure and high temperature bleed air to air that is drawn into the engine 112. The bleed air output from the precooler 410 may have a significantly reduced temperature, but its pressure will not be significantly changed. This lower temperature, high pressure air is fed into a turbine 440 having a variable area turbine nozzle. As with the foregoing embodiments, the variable area turbine nozzle may be replaced with a multiple position turbine nozzle or a fixed area turbine nozzle.

Work performed by the high pressure bleed air turning the turbine 440 may be utilized to power other equipment associated with the engine 112 or aircraft 122, with the output bleed air having a significantly reduced pressure and temperature. By way of example, the turbine 440 may be utilized to power a generator 475, mechanically rotate gears of a gearbox 480, drive a pump 485, or any combination of the foregoing associated with either the engine 112 or aircraft 122. Those skilled in the art will understand that the turbine 440 may be mechanically or fluidically linked to one or more of the foregoing components to capitalize upon the work performed by the high pressure bleed air rotating the turbine. In exemplary form, the temperature of the bleed air output from the turbine 440 is lower than the flow path temperature of air coming out of the precooler 410. This, again, is in stark contrast to prior art bleed air cooling systems that were unable to deliver bleed air to the aircraft 122 at a temperature below that of the ambient flow path air coming into the engine 112.

Figure 5:
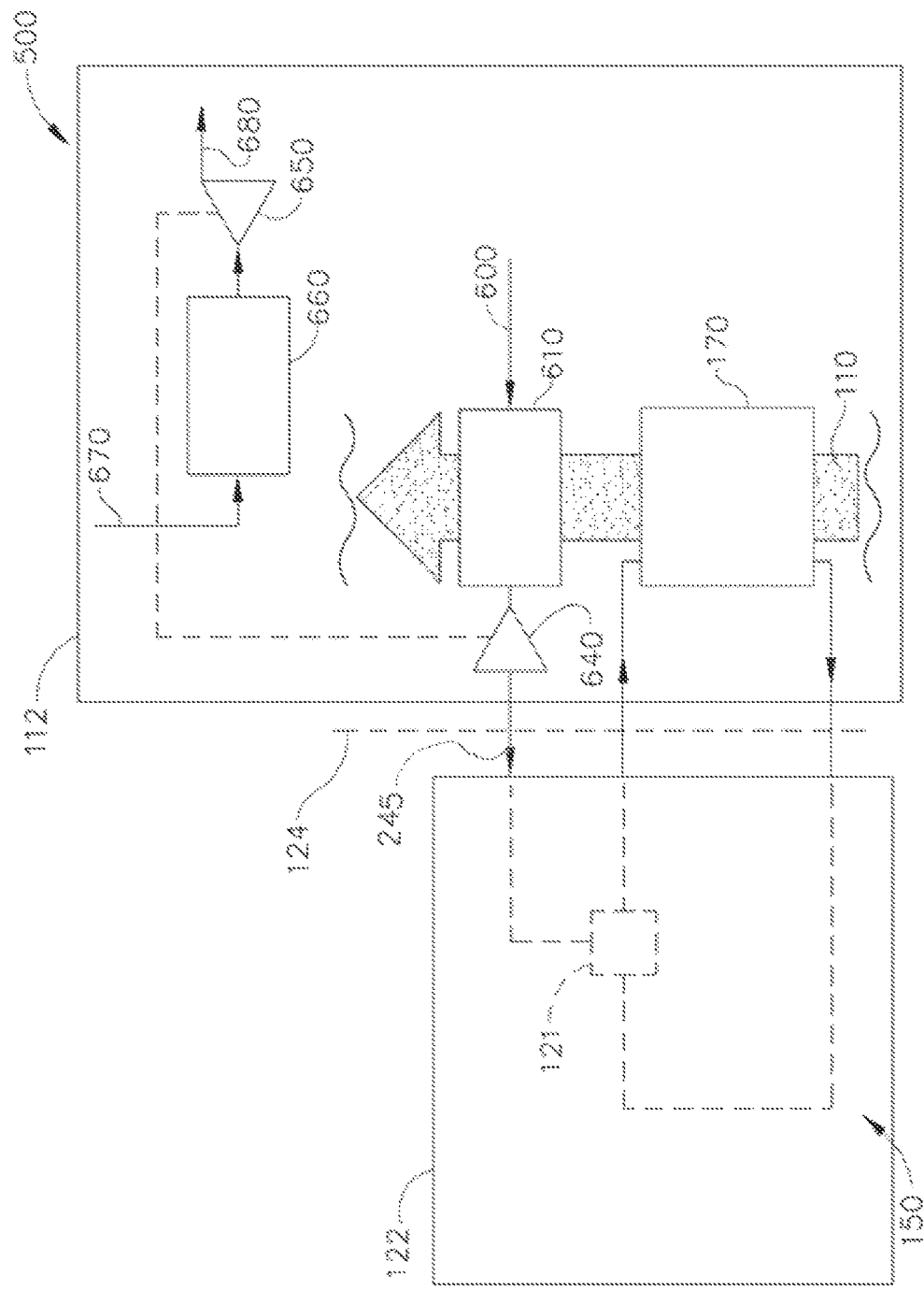
FIG. 5 is a schematic diagram of a yet another exemplary embodiment of a cold air cooling system, shown by way of example as part of an airplane.

Referencing FIG. 5, a third exemplary cold air cooling system 500 is configured to supply unregulated bleed air from a high pressure compressor (HPC) section of a jet engine 112 to an aircraft 122 at a temperature that is below the temperature of the air flowing into the engine 112. For illustration purposes only, the third exemplary cold air cooling system 500 will be explained for use with the TMS loop 150 from the first exemplary embodiment. Accordingly, like reference numerals refer to similar structures as discussed pursuant to the first exemplary embodiment and will not be repeated in furtherance of brevity.

As with the first exemplary embodiment, the third exemplary cold air cooling system 500 includes a bleed air inlet feed 600 that is unregulated from the HPC section of the engine 112. This bleed air inlet feed 600 supplies high pressure and high temperature compressed air to a first precooler 610. In exemplary form, this first precooler 610 facilitates the transfer of thermal energy from the high pressure and high temperature bleed air to air that is drawn into the engine 112. The bleed air output from the precooler 610 may have a significantly reduced temperature, but its pressure will not be significantly changed. This lower temperature, high pressure air is fed into a turbine 640 having a variable area turbine nozzle. As with the foregoing embodiments, a multiple position turbine nozzle or a fixed area turbine nozzle may be used in lieu of the variable area turbine nozzle.

Work performed by the high pressure bleed air turning the turbine 640 may be utilized to power other equipment associated with the engine 112 or aircraft 122, with the output bleed air having a significantly reduced pressure and temperature. By way of example, the turbine 640 is utilized to power a compressor 650 on the outlet side of an engine cooler 660. By way of example, the engine cooler 660 draws in flow path temperature air via an inlet 670 at a predetermined pressure. The flow path temperature air acts as a thermal sink to draw heat away from a heat source associated with the cooler 660 and exits the cooler at a pressure lower than the outlet pressure discharge 680 of the compressor 650. The pressure differential across the compressor 650 is operative to pull air into the compressor and ultimately through the inlet 670. Those skilled in the art will understand that the turbine 640 may be mechanically or fluidically linked to the compressor 650 to capitalize upon the work performed by the high pressure bleed air rotating the turbine. In exemplary form, the temperature of the bleed air output from the turbine 640 is lower than the flow path temperature of air coming out of the precooler 610. This, once again, is in stark contrast to prior art bleed air cooling systems that were unable to deliver bleed air to the aircraft 122 at a temperature below that of the air coming into the engine 112.

It should be noted, however, that air other than flow path air may be utilized as the thermal sink for any of the precoolers 210, 230, 410, 610, 730. Moreover, while the foregoing exemplary embodiments have been described as including precoolers, it should be understood that a precooler is synonymous with a heat exchanger.

It should also be understood that while the systems 100, 280, 300, 500, 700 have been described as being associated with a jet engine 112, it is also within the scope of the disclosure to have these systems in fluid communication with other vehicles for use on water or land (e.g., boats and automobiles).

Figure 7:
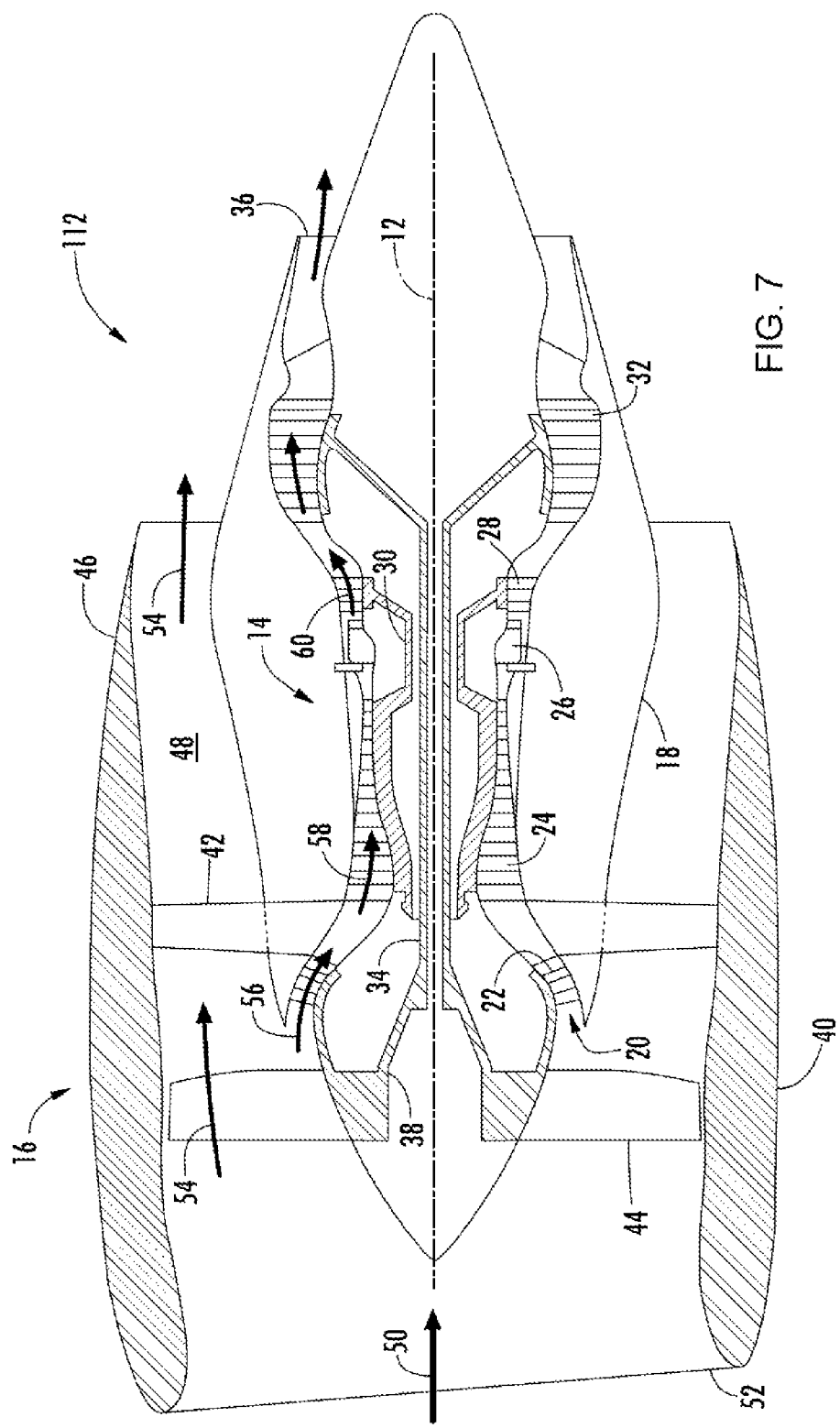
FIG. 7 illustrates a cross-sectional view of one embodiment of a gas turbine engine that may be utilized within an aircraft in accordance with aspects of the present subject matter.

FIG. 7 illustrates a cross-sectional view of one embodiment of a gas turbine engine 112 that may be utilized within an aircraft in accordance with aspects of the present subject matter, with the engine 112 being shown having a longitudinal or axial centerline axis 12 extending therethrough for reference purposes. Although shown as a turbofan jet engine, any suitable jet engine can be utilized with the cooling system described herein. For example, suitable jet engines include but are not limited to high-bypass turbofan engines, low-bypass turbofan engines, turbojet engines, turboprop engines, turboshaft engines, propfan engines, and so forth.

As shown in FIG. 7, the exemplary engine 112 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 7, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

As used herein, flow path temperature refers to the median temperature of a fluid, namely air, while it is flowing through a predetermined section/stage of a jet engine. More specifically, flow path temperature can be no lower than the lowest temperature air drawn into the intake of a jet engine. As air is drawn into the intake and compressed, the air will increase in temperature and, accordingly, have a flow path temperature near the end of the compressor section that is above that of the flow path temperature of air at the intake.

It should also be noted that while the foregoing exemplary embodiments have been described in the context of an aircraft, the instant disclosure is equally applicable to vehicles beyond aircraft. Any vehicle having cabin or other cooling needs may be addressed using the present disclosure. For example, a boat that is jet powered may benefit from the exemplary embodiments of the instant disclosure to provide cooling to the cabin and/or the electronics associated with the boat. Consequently, the foregoing disclosure is by no means limited in application to aircraft, but rather is applicable to any vehicle utilizing jet power to provide a cooling stream wherever beneficial. Those skilled in the art will readily recognize the utility of the present disclosure in the context of other vehicles.

Following from the above description, it should be apparent to those of ordinary skill in the art that, while the methods and apparatuses herein described constitute exemplary embodiments of the present disclosure, it is to be understood that the disclosures contained herein are not limited to the above precise embodiments and that changes may be made without departing from the scope of the disclosure. Likewise, it is to be understood that it is not necessary to meet any or all of the identified advantages or objects of the disclosure in order to fall within the scope of the disclosure, since inherent and/or unforeseen advantages of the present disclosure may exist even though they may not have been explicitly discussed herein.

What is claimed is:

1. A jet engine comprising:
   an engine compressor;
   a combustor in fluid communication with the engine compressor;
   an engine turbine in fluid communication with the combustor to receive combustion products from the combustor; and
   a bleed air cooling system in fluid communication with bleed air from the engine compressor, wherein the bleed air cooling system comprises:
   a first precooler in fluid communication with the bleed air from the engine compressor;
   a cooling system turbine in fluid communication with and downstream from the first precooler;
   a cooling system compressor in fluid communication with and downstream from the first precooler, the cooling system compressor in fluid communication with and downstream from the engine compressor;
   a second precooler in fluid communication with and downstream from the cooling system compressor, the second precooler in fluid communication with and downstream from the engine compressor; and
   a third precooler, the third precooler in fluid communication with and downstream from both the first precooler and the engine compressor, wherein each of the first, second, and third precoolers is cooled by an engine cooling stream passing through the jet engine,
   wherein a discharge conduit from the cooling system turbine is configured to be in fluid communication with at least one of an aircraft thermal management system and an aircraft environmental control system.

2. The jet engine of claim 1, wherein the bleed air cooling system further comprises a gearbox operatively coupled to and powered by the cooling system turbine.

3. The jet engine of claim 2, wherein the cooling system compressor is operatively coupled to and powered by the cooling system turbine, and
   wherein the cooling system turbine has a multiple position turbine nozzle.

4. The jet engine of claim 3, wherein the cooling system compressor comprises a suction compressor, the jet engine further comprising:
   a first bypass line, the first bypass line connected between an inlet of the cooling system turbine and an outlet of the cooling system turbine;
   a first bypass control valve, the first bypass control valve in series with the first bypass line; and
   a thermocouple, the thermocouple in thermal communication with air discharged from the cooling system turbine,
   wherein based on temperature readings from the thermocouple, the first bypass line selectively allows air discharged from the second precooler to be directed to at least one of the aircraft thermal management system and the aircraft environmental control system, without traveling through the cooling system turbine.

5. The jet engine of claim 2, further comprising:
   a second bypass line, the second bypass line connected between an outlet of the third precooler and the discharge conduit, the discharge conduit downstream from an outlet of the cooling system turbine, and upstream of at least one of the aircraft thermal management system and the aircraft environmental control system, without traveling through the cooling system turbine; and
   a second bypass control valve, the second bypass control valve downstream from and in fluid communication with the first precooler, the second bypass control valve upstream from and in fluid communication with both the second precooler and the third precooler,
   wherein the second bypass control valve selectively controls air flow to both the second precooler and the third precooler.

6. The jet engine of claim 5, wherein the cooling system turbine has a variable area turbine nozzle and is operative to generate power to drive a pump associated with the jet engine.

7. The jet engine of claim 6, further comprising:
an engine thermal management system in two-way fluid communication with at least one of the aircraft thermal management system and the aircraft environmental control system of an aircraft,
wherein relative to a flow direction of thermal communication with an engine inlet airstream:
the engine thermal management system is upstream of the second precooler;
the second precooler is upstream of the third precooler; and
the third precooler is upstream of the first precooler.

8. A method of providing cooling fluid from a jet engine, the jet engine comprising: an engine compressor; a combustor in fluid communication with the engine compressor; an engine turbine in fluid communication with the combustor to receive combustion products from the combustor; and a bleed air cooling system in fluid communication with bleed air from the engine compressor, wherein the bleed air cooling system comprises: a first precooler in fluid communication with the bleed air from the engine compressor; a cooling system turbine in fluid communication with and downstream from the first precooler; a cooling system compressor in fluid communication with and downstream from the first precooler, the cooling system compressor in fluid communication with and downstream from the engine compressor; a second precooler in fluid communication with and downstream from the cooling system compressor, the second precooler in fluid communication with and downstream from the engine compressor; and a third precooler, the third precooler in fluid communication with and downstream from both the first precooler and the engine compressor, wherein each of the first, second and third precoolers is cooled by an engine cooling stream passing through the jet engine, wherein a discharge conduit from the cooling system turbine in configured to be in fluid communication with at least one of an aircraft thermal management system and an aircraft environmental control system; the method comprising extracting a first portion of an airflow flowing through the engine compressor of the jet engine at a first temperature; directing the first portion of the airflow into fluid communication with the first precooler to reduce a temperature of the first portion of the airflow to a second temperature; and flowing the first portion of the airflow downstream from the first precooler through a cooling system turbine to reduce the temperature of the first portion of the airflow to a third temperature, wherein the third temperature is less than a flow path temperature of air flowing into the jet engine.

9. The method of claim 8, wherein flowing the first portion of the airflow through the turbine is operative to generate power to drive a gearbox associated with the jet engine.

10. The method of claim 8, wherein flowing the first portion of the airflow through the turbine is operative to generate power to drive the cooling system compressor.

11. The method of claim 10, wherein the cooling system compressor comprises a suction compressor.

12. The method of claim 8, further comprising compressing the first portion of the airflow downstream from the first precooler from a first lower pressure to a second higher pressuring using the cooling system compressor, wherein compressing the first portion of the airflow increases the temperature of the first portion of the airflow to a fourth temperature greater than the second temperature and less than the first temperature.

13. The method of claim 12, wherein directing the first portion of the airflow through the cooling system turbine is operative to power the cooling system compressor.

14. The method of claim 12, further comprising directing the first portion of the airflow into fluid communication with the second precooler, downstream from the cooling system compressor and upstream from the cooling system turbine, to reduce the temperature of the first portion of the airflow to a fifth temperature, where the fifth temperature is less than the fourth temperature and greater than the third temperature.

15. An aircraft comprising:
a jet engine comprising:
a jet engine thermal management system in two-way fluid communication with an aircraft thermal management system, wherein the jet engine thermal management system receives a discharge stream from the aircraft thermal management system and supplies an inlet stream to the aircraft thermal management system;
a cold fluid system comprising:
a first precooler in fluid communication with and downstream from an engine compressor of the jet engine;
a first turbine in fluid communication with and downstream from the first precooler;
a cooling system compressor in fluid communication with and downstream from the first precooler, the cooling system compressor in fluid communication with and downstream from the engine compressor;
a second precooler in fluid communication with and downstream from the cooling system compressor, the second precooler in fluid communication with and downstream from the engine compressor;
a third precooler, the third precooler in fluid communication with and downstream from both the first precooler and the engine compressor, wherein each of the first, second, and third precoolers is cooled by an engine cooling stream passing through the jet engine; and
the aircraft including at least one of the aircraft thermal management system and an aircraft environmental control system,
wherein an output from the first turbine is in fluid communication with at least one of the aircraft thermal management system and the aircraft environmental control system.

16. The aircraft of claim 15, wherein the jet engine further comprises a gearbox operatively coupled to and powered by the first turbine.

17. The aircraft of claim 16, further comprising the cooling system compressor operatively coupled to and powered by the first turbine.

* * * * *